(12) United States Patent
Yang

(10) Patent No.: US 7,903,423 B2
(45) Date of Patent: Mar. 8, 2011

(54) ELECTRONIC DEVICE WITH OPTICAL DISC DRIVE

(75) Inventor: Cheng-Yuan Yang, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/847,162

(22) Filed: Jul. 30, 2010

(65) Prior Publication Data

US 2010/0293562 A1 Nov. 18, 2010

Related U.S. Application Data

(63) Continuation of application No. 12/185,381, filed on Aug. 4, 2008, now Pat. No. 7,793,312.

(30) Foreign Application Priority Data

Sep. 11, 2007 (TW) ............................... 96133943 A

(51) Int. Cl.
*H05K 5/00* (2006.01)
*H05K 7/00* (2006.01)
*G11B 17/03* (2006.01)
*E05C 1/04* (2006.01)

(52) U.S. Cl. .................. 361/732; 361/759; 361/679.4; 361/679.41; 361/679.42; 361/679.43; 292/150; 720/610; 720/637; 720/639; 720/735

(58) Field of Classification Search .................. 720/647, 720/657, 600, 601, 637, 639, 610; 361/683, 361/679.56, 679.4–679.45, 732, 759; 369/292, 30.93, 30.96, 30.97, 30.99, 75.2, 77.1, 77.2; 360/99.06, 99.3, 96.3, 99.02; 292/251.5, 137, 138, 140, 145, 146, 150

See application file for complete search history.

(56) References Cited

U.S. PATENT DOCUMENTS

| | | | |
|---|---|---|---|
| 6,870,740 B2 * | 3/2005 | Hsu et al. | 361/732 |
| 6,981,269 B2 * | 12/2005 | Minase | 720/602 |
| 7,159,227 B2 * | 1/2007 | Hsu | 720/657 |
| 7,363,634 B2 | 4/2008 | Lin | |
| 2006/0007649 A1 * | 1/2006 | Yang | 361/683 |
| 2007/0081305 A1 | 4/2007 | Chien et al. | |

* cited by examiner

*Primary Examiner* — Jayprakash N Gandhi
*Assistant Examiner* — Jerry Wu
(74) *Attorney, Agent, or Firm* — Thomas, Kayden, Horstemeyer & Risley, LLP

(57) ABSTRACT

An optical disk drive (ODD) disposed in the base of a notebook computer is provided. The front end of the tray of the ODD has a panel having a body with a side edge, a guide member and a fastening member. The guide member is connected to the body, and it can move relatively to the body. The guide member has a guide channel having a first end and a second end. The fastening member has a sheet structure and a guide pillar inserted into the guide channel protruding from the sheet structure. When the guide member is moved to allow the guide pillar to move from the second end to the first end along the guide channel, the sheet structure of the fastening member is driven to protrude from the side edge to be fastened to the base of the notebook computer.

14 Claims, 7 Drawing Sheets

ELECTRONIC DEVICE WITH OPTICAL DISC DRIVE

CROSS-REFERENCE TO RELATED APPLICATIONS

This application is a continuation of U.S. patent application Ser. No. 12/185,381, filed Aug. 4, 2008, which claims the benefit of Taiwan Patent applications Serial No. 96133943, filed Sep. 11, 2007.

BACKGROUND OF THE INVENTION

1. Field of the Invention

The invention relates to an electronic device and, more particularly, to an electronic device with an optical disk drive.

2. Description of the Related Art

Along with the development of the science and technology, the standard and the manufacture technology of a notebook computer also continuously increase. Compared with a conventional desktop computer, the notebook computer has a lighter weight, a smaller dimension and a higher portability. Therefore, requirements of consumers for the notebook computer increase day by day.

FIG. 1 is a schematic diagram showing a conventional notebook computer provided with an optical disk drive. As shown in FIG. 1, a notebook computer 10 includes a base 11 and a screen 12, and an optical disk drive 13 is installed in the base 11. The optical disk drive 13 includes a main body 131, a tray 132 and a panel 133. The tray 132 can slide out of the main body 131 to hold an optical disk. The panel 133 is disposed at the front end of the tray 132. The panel 133 has a touch button 134 for controlling the action of the optical disk drive 13 and controlling the tray 132 to slide in or out.

The notebook computer is a type of portable electronic product, and when it is carried, the tray 132 often slides out when the notebook computer is shaken or knocked. Sometimes, the touch button 134 of the optical disk drive 13 is touched by error, and then the tray 132 also slides out. No matter what condition it is, when the tray 132 slides out while the optical disk drive 13 is not used or a user does not notice the condition of the optical disk drive 13, the tray 132 is easy to be damaged because of collision Then the optical disk drive 13 cannot be used.

How to allow the tray not to slide out easily when the optical disk drive is not used needs to be solved by the technology.

BRIEF SUMMARY OF THE INVENTION

The objective of the invention is to design a fastening mechanism used in a panel of an optical disk drive. When the optical disk drive is not used, it can be locked to allow a tray to be incapable of sliding out. When the optical disk drive is used, it can be unlocked to allow the tray to smoothly slide out.

The invention provides an optical disk drive disposed in a base of a notebook computer. The optical disk drive includes a tray and a panel disposed at the front end of the tray, and the panel further includes a body, a guide member and a first fastening member.

The body of the panel has a first side edge. The guide member is connected to the body, and it can move relatively to the body. The guide member has a first guide channel having a first end and a second end, and the first end is nearer to the first side edge than the second end.

The first fastening member has a sheet structure and a first guide pillar protruding from the sheet structure. The first guide pillar is inserted into the first guide channel. When the guide member is moved to allow the first guide pillar to move from the second end to the first end along the first guide channel, the sheet structure of the first fastening member is driven to protrude from the first side edge to be fastened to the base of the notebook computer.

In the embodiment, the first guide channel is an oblique long through hole, and the first guide channel extends from the first end at the top-left to the second end at the bottom-right.

In another preferred embodiment, the body of the panel further has a second side edge, and the guide member further has a second guide channel. The second guide channel extends from a third end at the bottom-left to a fourth end at the top-right.

The panel further includes a second fastening member, and the second fastening member has a sheet structure and a second guide pillar protruding from the sheet structure. The second guide pillar is inserted into the second guide channel. When the guide member is moved to allow the second guide pillar to move from the fourth end to the third end along the second guide channel, the sheet structure of the second fastening member is driven to protrude from the second side edge to be fastened to the base of the notebook computer.

These and other features, aspects, and advantages of the present invention will become better understood with regard to the following description, appended claims, and accompanying drawings.

BRIEF DESCRIPTION OF THE SEVERAL VIEWS OF THE DRAWINGS

Advantages of the invention will become better understood with regard to the following description and accompanying drawings.

DETAILED DESCRIPTION OF THE EMBODIMENTS

Figure 1:
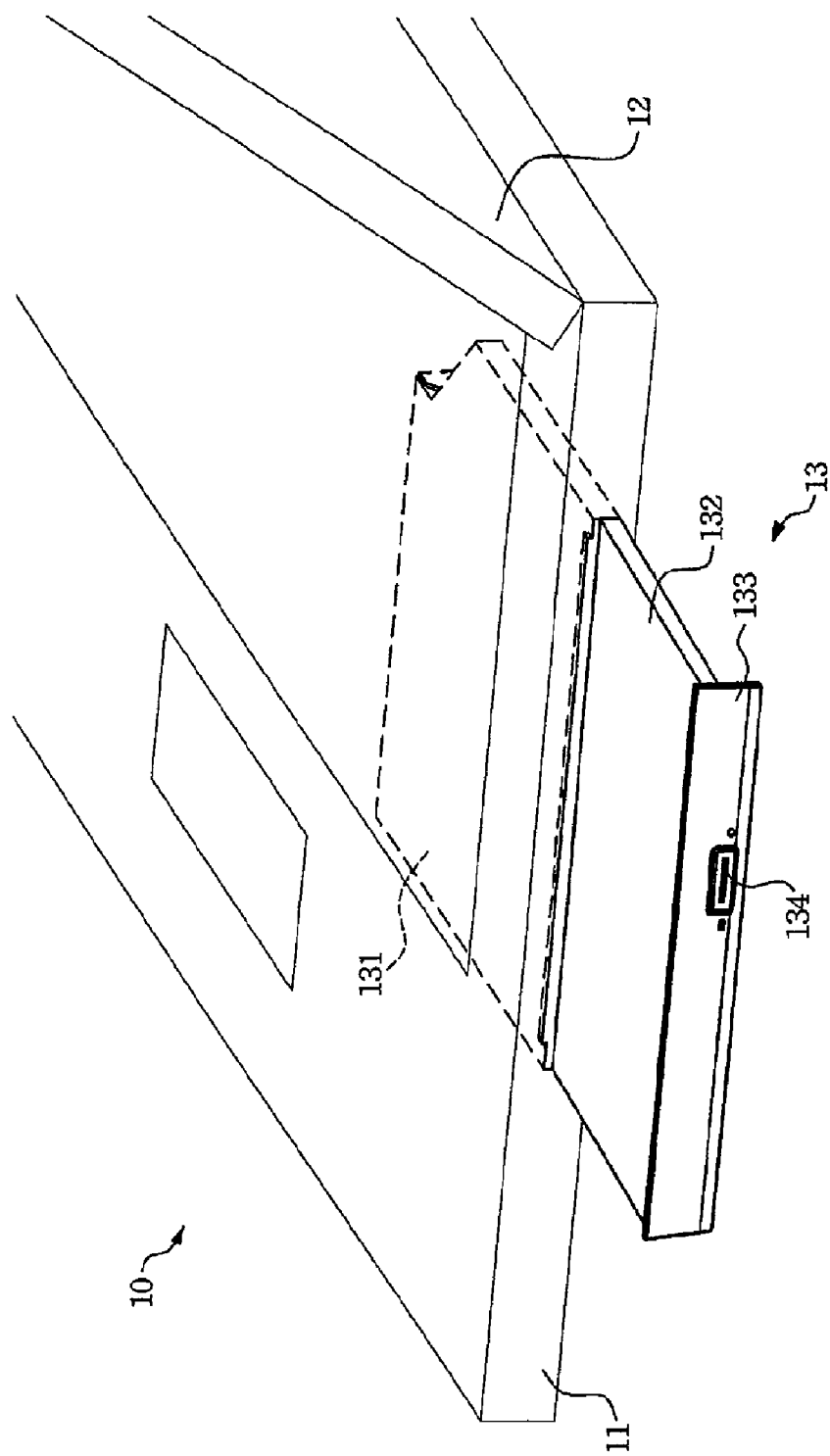
FIG. 1 is a schematic diagram showing a conventional notebook computer which is provided with an optical disk drive.
Figure 2:
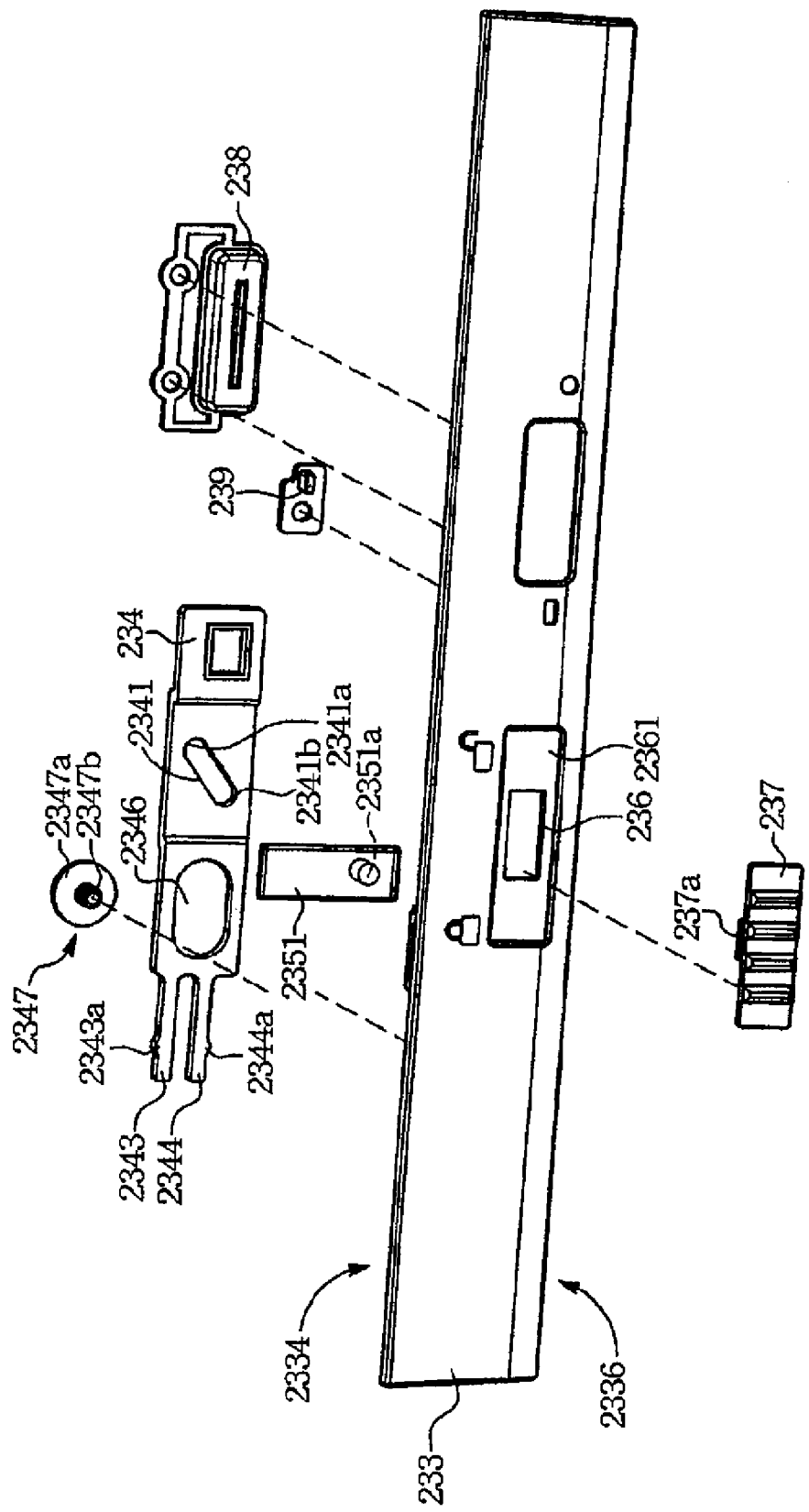
FIG. 2 is an exploded diagram showing a panel of an embodiment of the invention.

FIG. 2 is an exploded diagram showing a panel of an optical disk drive of an embodiment of the invention. The optical disk drive of the embodiment of the invention is disposed in a main body of an electronic device. For example, the main body is a base, and the electronic device is a notebook computer. The optical disk drive is disposed in a container of the main body. The optical disk drive at least includes a body, a tray and a panel, and the panel is disposed at the front end of the tray. As shown in FIG. 2, the panel includes a body 233, a guide member 234 and a first fastening member 2351.

The panel of the optical disk drive of the notebook computer of the invention further includes a first button, such a touch button 238 disposed at the front of the optical disk drive and an action indication lamp 239. The touch button 238 is used to control the action of the optical disk drive and control the tray to slide in or out, and the action indication lamp 239 is used to indicate the present working state.

Figure 3A:
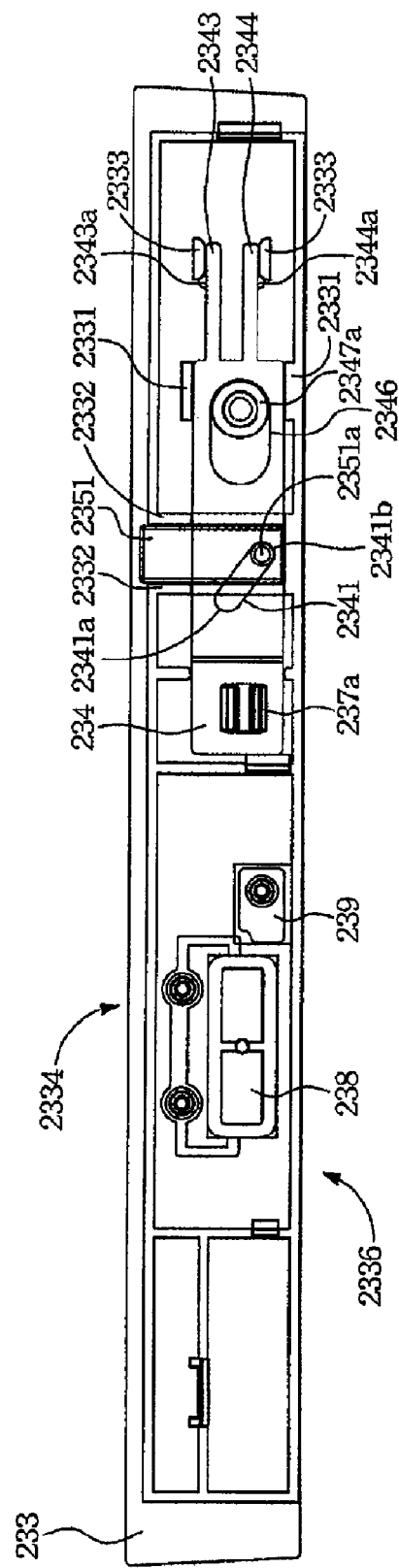
FIG. 3A is a schematic diagram showing a panel of an embodiment of the invention in an unlocked state.

FIG. 3A is a schematic diagram showing a panel of an embodiment of the invention in an unlocked state. The following description is based on the back of the panel, and the position relationship is illustrated with the FIG. 3A.

As shown in FIG. 2 and FIG. 3A, the guide member 234 is connected to the back of the body 233, and it can move relatively to the body 233. The panel further includes a first lateral through hole 236 and a second button, such a sliding button 237. The first lateral through hole 236 is formed at the body 233 in the mode of paralleling the movement direction of the guide member 234, and it is adjacent to the guide member 234.

The sliding button 237 moves to a first position, the touch button 238 is triggered to expose the tray; when the sliding button 237 moves to a second position, the sliding button 237 is fastened to the main body to avoid exposing the tray.

The sliding button 237 is disposed at the front end of the body 233, and the back of the sliding button 237 has a fixing member 237a. The fixing member 237a passes through the first lateral through hole 236 to be combined with the guide member 234. The lateral size of the fixing member 237a is smaller than the lateral size of the first lateral through hole 236. Then the sliding button 237 can drive the guide member 234 to laterally move.

In a preferred embodiment, the guide member 234 has a through hole corresponding to the first lateral through hole 236, and the fixing member 237a of the sliding button 237 can be fastened to the through hole. The front surface of the body 233 may have a recessed runner 2361. The recessed runner 2361 is adjacent to the edge of the first lateral through hole 236, and the lateral size of the recessed runner 2361 is larger than the lateral size of the first lateral through hole 236. In this way, the sliding button 237 can laterally slide in the recessed runner 2361.

As shown in FIG. 3A, the panel further includes two first lateral retaining walls 2331 which parallel the movement direction of the guide member 234. The first lateral retaining walls 2331 are formed at the surface of the body 233, and they are adjacent to top and bottom sides of the guide member 234, respectively. Then, the first lateral retaining walls 2331 can limit the position of the guide member 234 in a top-bottom direction to limit the guide member 234 to lateral movement.

In FIG. 3A, the body 233 has a first side edge 2334. The guide member 234 has a first guide channel 2341 having a first end 2341a and a second end 2341b. The first end 2341a is nearer to the first side edge 2334 than the second end 2341b.

In the embodiment, the first side edge 2334 is located at the top edge of the body 233, and the first guide channel 2341 is an oblique long channel. The first guide channel 2341 extends from the first end 2341a at the top-left to the second end 2341b at the bottom-right (seen from the back of the panel).

In FIG. 2, the first fastening member 2351 has a sheet structure and a first guide pillar 2351a protruding from the sheet structure. The first fastening member 2351 is disposed between the body 233 and the guide member 234, and the first guide pillar 2351a is inserted into the first guide channel 2341.

As shown in FIG. 3A, in the embodiment, the panel further includes two longitudinal retaining walls 2332 perpendicular to the movement direction of the guide member 234. The longitudinal retaining walls 2332 are formed at the surface of the body 233, and they are adjacent to right and left sides of the first fastening member 2351, respectively. Then, the longitudinal retaining walls 2332 can limit the position of the first fastening member 2351 in a left-right direction to limit the first fastening member 2351 to longitudinal movement.

In FIG. 3A, when the panel is in a unlocked state, the first fastening member 2351 is within the first side edge 2334 of the body 233. The first guide pillar 2351a is located at the bottom-right of the first guide channel 2341. In a preferred embodiment, the first guide pillar 2351a is located at the second end 2341b of the first guide channel 2341.

Figure 3B:
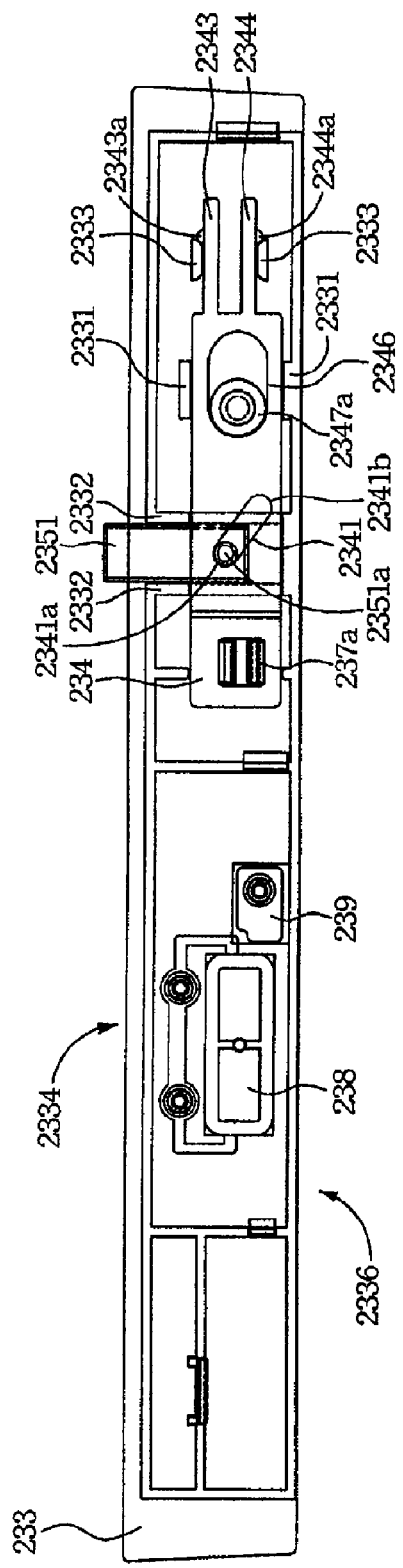
FIG. 3B is a schematic diagram showing a panel of an embodiment of the invention in a locked state.

FIG. 3B is a schematic diagram showing a panel of an embodiment of the invention in a locked state. When the guide member 234 is driven by the sliding button 237 to move toward the right, the first guide pillar 2351a moves from the second end 2341b to the first end 2341a along the first guide channel 2341. The sheet structure of the first fastening member 2351 is driven to protrude from the first side edge 2334 of the body 233 to be fastened to the base of the notebook computer. Therefore, when the panel is in a locked state, the first fastening member 2351 is upward fastened to the base (the third member) of the notebook computer to prevent the tray from sliding out.

To allow the panel in the unlocked or locked state to be further stable and have certain retaining force, the following mechanical features are added. As shown in FIG. 3A and FIG. 3B, a top elastic arm 2343 and a bottom elastic arm 2344 parallel to each other are extend from one end of the guide member 234. The top side of the top elastic arm 2343 and the bottom side of the bottom elastic arm 2344 have corresponding protrusions 2343a and 2344a, respectively. The panel further includes at least two second lateral retaining walls 2333 formed at the surface of the body 233 and the second lateral retaining walls 2333 are adjacent to the top side of the top elastic arm 2343 and the bottom side of the bottom elastic arm 2344, respectively.

As shown in FIG. 3A, when the panel is in the unlocked state, the guide member 234 is moved to the left, and the two protrusions 2343a and 2344a are located at the left of the second lateral retaining walls 2333. At that moment, the guide member 234 cannot be easily moved toward the right. A user should apply certain external force to push the sliding button 237 to make the two elastic arms 2343 and 2344 deformed, and then the guide member 234 can be moved toward the right.

As shown in FIG. 3B, when the panel is in the locked state, the guide member 234 is moved to the right, and the two protrusions 2343a and 2344a are located at the right of the second lateral retaining walls 2333. At that moment, the guide member 234 cannot be easily moved toward the left. A user should apply certain external force to push the sliding button 237 to make the two elastic arms 2343 and 2344 deformed, and then the guide member 234 can be moved toward the left.

In the embodiment, the guide member 234 further has a second lateral through hole 2346. A locking member 2347 has a locking end 2347b and an expansion end 2347a. The locking end 2347b passes through the second lateral through hole 2346 to be fixedly connected to the body 233. The longitudinal size of the expansion end 2347a is larger than the longitudinal size of the second lateral through hole 2346 to limit the front-back movement of the guide member 234.

The front and back of the guide member 234 are adjacent to the back of the panel and the expansion end 2347a of the locking member 2347, respectively. In a preferred embodiment, the locking member 2347 is a screw. Furthermore, the locking end 2347*b* of the screw also can be used to limit the length of the lateral movement distance of the guide member 234.

Figure 4A:
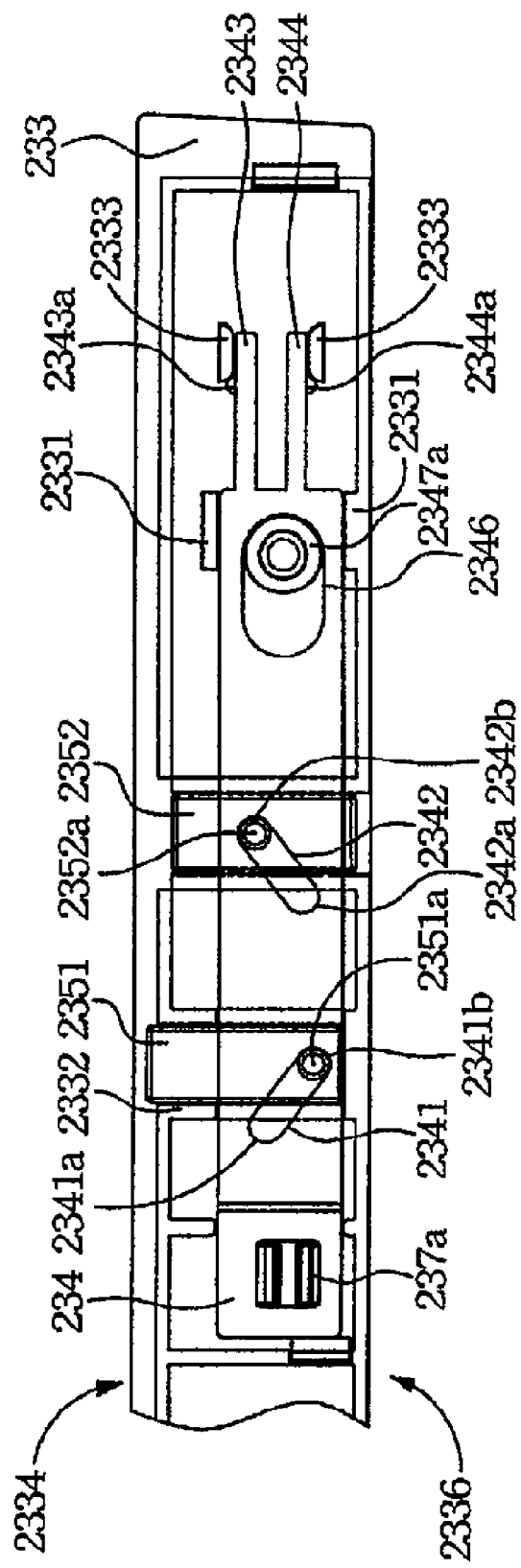
FIG. 4A is a schematic diagram showing a panel of another embodiment of the invention in an unlocked state.
Figure 4B:
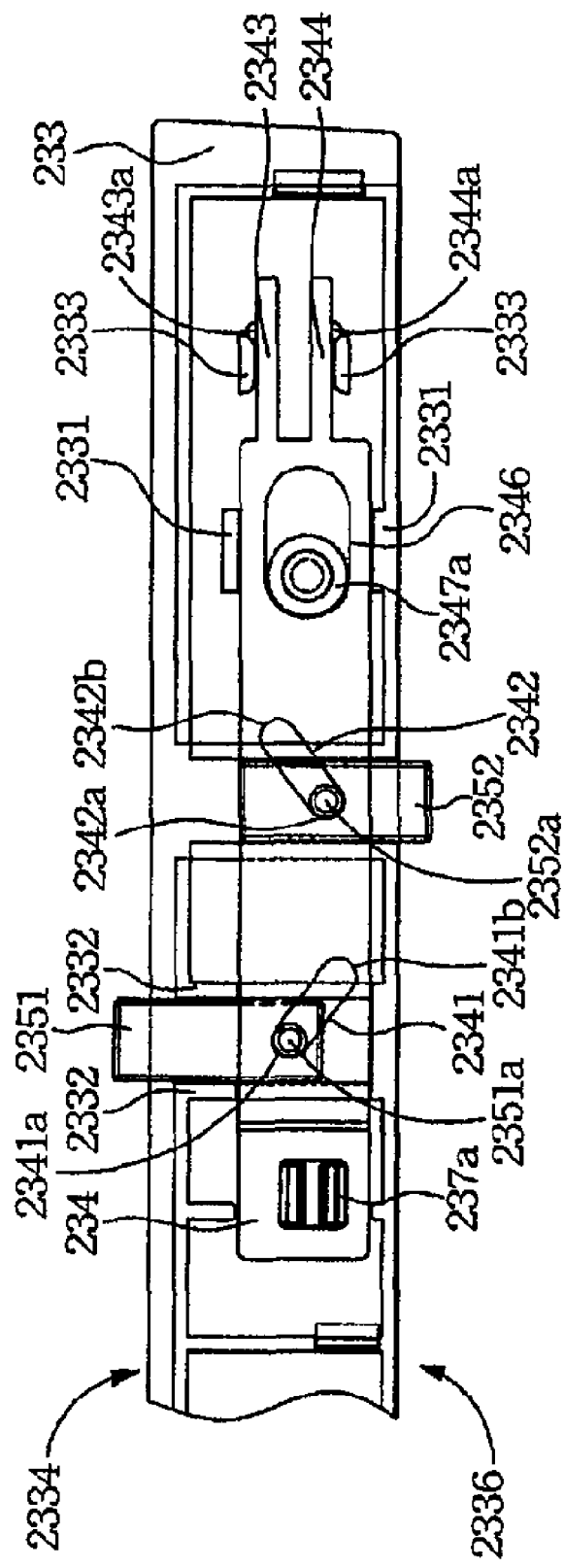
FIG. 4B is a schematic diagram showing a panel of another embodiment of the invention in a locked state.

In the embodiment, the first fastening member 2351 which can protrude from the first side edge 2334 of the body 233 is used to be upward fastened to the base (the third member) of the notebook computer. In another preferred embodiment, a second fastening member which can protrude from a second side edge 2336 of the body 233 may be added. The second fastening member may be downward fastened to the base (the fourth member) of the notebook computer further to allow the panel to be steadily locked. As shown in FIG. 4A and FIG. 4B, they are schematic diagrams showing the panel in an unlocked state and a locked state, respectively.

As shown in FIG. 4A, the body 233 further has a second side edge 2336. The guide member 234 further has a second guide channel 2342 having a third end 2342*a* and a fourth end 2342*b*. The third end 2342*a* is nearer to the second side edge 2336 than the fourth end 2342*b*. In a preferred embodiment, the second side edge 2336 is located at the bottom edge of the body 233, and the second guide channel 2342 is an oblique long channel. The second guide channel 2342 extends from the third end 2342*a* at the bottom-left to the fourth end 2342*b* at the top-right.

The panel further includes a second fastening member 2352 disposed between the body 233 and the guide member 234. The second fastening member 2352 also has a sheet structure and a second guide pillar 2352*a* protruding from the sheet structure, and the second guide pillar 2352*a* is inserted into the second guide channel 2342.

As shown in FIG. 4A, when the panel is in the unlocked state, the second fastening member 2352 is within the second side edge 2336 of the body 233, and the second guide pillar 2352*a* is located at the top-right of the second guide channel 2342. In a preferred embodiment, the second guide pillar 2352*a* is located at the fourth end 2342*b* of the second guide channel 2342.

As shown in FIG. 4B, it is a schematic diagram showing the panel of the embodiment of the invention in a locked state. When the guide member 234 is driven by the sliding button 237 to move toward the right, the second guide pillar 2352*a* moves from the fourth end 2342*b* to the third end 2342*a* along the second guide channel 2342. In this way, the sheet structure of the second fastening member 2352 is driven to protrude from the second side edge 2336 of the body 233 to be downward fastened to the base of the notebook computer. Therefore, when the panel is in the locked state, the second fastening member 2352 is downward fastened to the base (the fourth member) of the notebook computer to prevent the tray from sliding out.

In the embodiment, when the guide member 234 is driven by the sliding button 237 to move toward the right, the first fastening member 2351 upward protrudes from the top edge (the first side edge 2334) of the body 233, and the second fastening member 2352 also downward protrudes from the bottom edge (the second side edge 2336) of the body 233. In this way, the panel is locked further steadily, and the tray cannot easily slide out.

In the above embodiment, the movement direction of the guide member and the extension directions of the first and second guide channels can be changed according to an actual requirement. For example, if the guide member is moved toward the left to allow the panel to be locked, the first guide channel is changed to extend from the first end at the bottom-left to the second end at the top-right. When the panel needs to be locked, the guide member should be moved toward the left. At that moment, the first guide pillar moves from the first end at the bottom-left to the second end at the top-right, and then the first fastening member upward protrudes from the top edge of the body of the panel. Therefore, the above changes can be easily obtained based on the concept of the invention, and they are within the scope of the claims of the invention.

Figure 5:
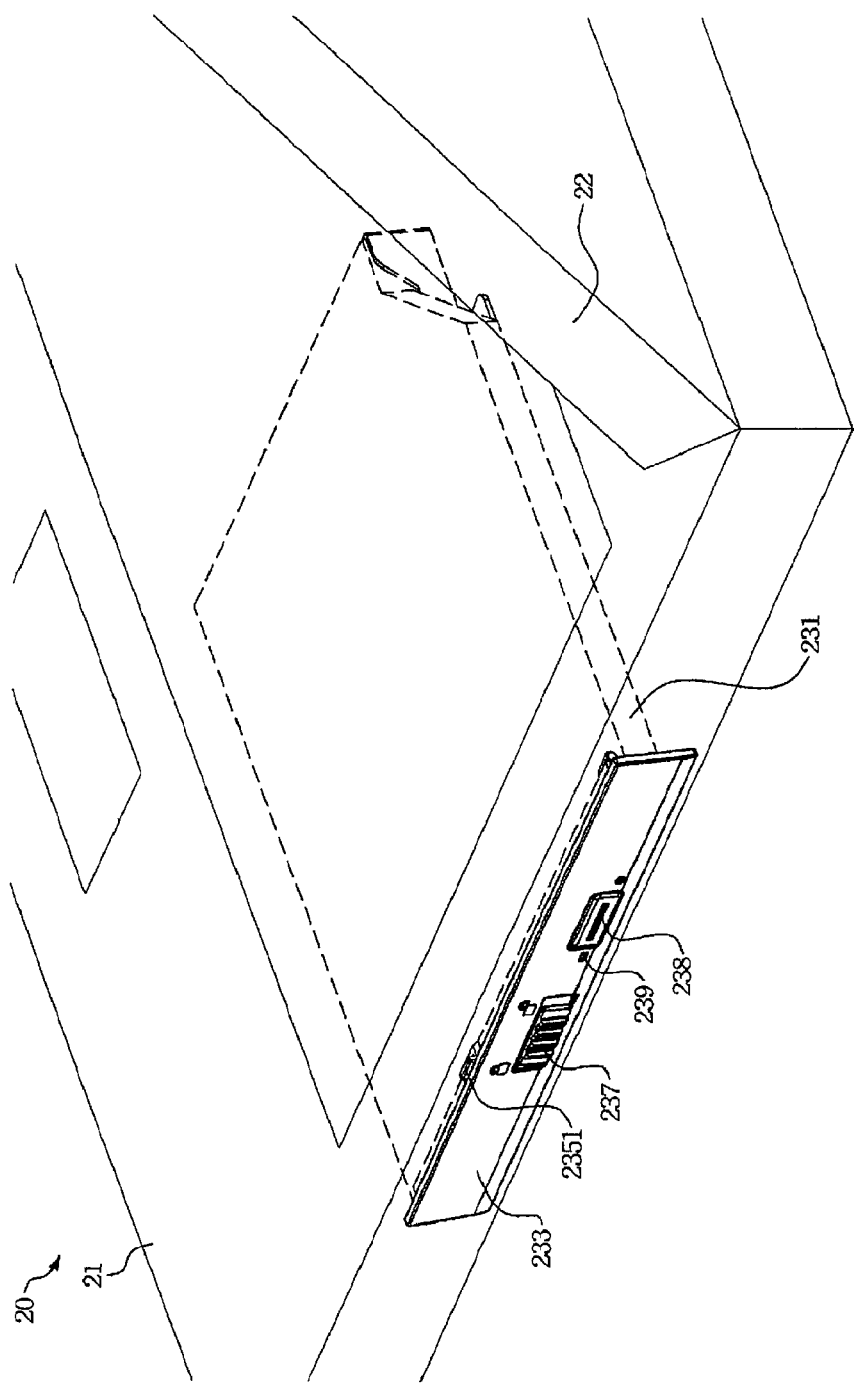
FIG. 5 is a schematic diagram showing a notebook computer of an embodiment of the invention.

FIG. 5 is a schematic diagram showing a notebook computer of an embodiment of the invention. The notebook computer 20 at least includes a base 21 and a screen 22. The optical disk drive is disposed in the base 21 of the notebook computer 20, and it at least includes a body 231, a tray (not shown) and a panel. The panel is disposed at the front end of the tray. When the optical disk drive is not used, the sliding button 237 can be slid toward the left to allow the first fastening member 2351 to upward protrude from the top edge of the body 233 of the panel. Then, the first fastening member 2351 is fastened to the base (the third member) of the notebook computer.

In one embodiment, the optical disk drive for containing a disc and disposed in the container. The optical disk drive comprises the first button and the second button movably connected to the main body. Most structure is the same as above mention. When the second button moves to the first position, the first button is triggered to expose the disc; when the second button moves to the second position, the second button is fastened to the main body to avoid exposing the disc.

In another embodiment, the optical disk drive includes a tray and a casing. The optical disk drive comprises the first button and the second button movably connected to the casing. Most structure is the same as above mention. When the second button moves to the first position, the first button is triggered to expose the tray; when the second button moves to the second position, the second button is fastened to the casing to avoid exposing the tray.

To sum up, via the design of the panel mechanism of the invention, when the optical disk drive is not used, it can be locked to prevent the tray from sliding out; when the optical disk drive needs to be used, it can be unlocked to allow the tray to smoothly slide out.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising: a main body having a container; and an optical disk drive having a tray and disposed in the container, the optical disk drive comprising:

a first button disposed at the front of the optical disk drive; and a second button disposed at the front of the optical disk drive and movably connected to the main body, when the second button moves to a first position, the first button is triggered to expose the tray; when the second button moves to a second position, the second button is fastened to the main body to avoid exposing the tray;

a panel disposed at the front of the tray, the panel has a panel body having a first side edge, and a guide member connected to the panel body, wherein the guide member is capable of moving relatively to the panel body, the guide member has a first guide channel having a first end and a second end, and the first end is nearer to the first side edge than the second end, wherein, one end of the guide member laterally extends to form a top elastic arm and a bottom elastic arm which are parallel to each other, each of the top side of the top elastic arm and the bottom side of the bottom elastic arm has a corresponding protrusion, the panel further comprises at least two second lateral retaining walls formed at a surface of the panel body, the guide member cannot be easily moved toward the right when the protrusions are located at the left of the second lateral retaining walls, and the guide member cannot be easily moved toward the left when the protrusions are located at the right of the second lateral retaining walls.

2. The electronic device according to claim 1, wherein the panel further has a first fastening member having a sheet structure and a first guide pillar protruding from the sheet structure.

3. The electronic device according to claim 2, wherein the first guide pillar is inserted into the first guide channel, wherein when the guide member is moved to allow the first guide pillar to move from the second end to the first end along the first guide channel, the sheet structure is driven to protrude from the first side edge to be fastened to the base.

4. The electronic device according to claim 3, wherein the panel further comprises:
    a first lateral through hole formed at the panel body and being parallel to the movement direction of the guide member; and
    the second button comprising a sliding button, the sliding button disposed at the front end of the panel body, wherein the back of the sliding button has a fixing member which passes through the first lateral through hole to be combined with the guide member, and the lateral size of the fixing member is smaller than the lateral size of the first lateral through hole to allow the sliding button to be capable of driving the guide member to laterally move.

5. The electronic device according to claim 3, wherein the panel further comprises two first lateral retaining walls parallel to the movement direction of the guide member, the two first lateral retaining walls are formed at the surface of the panel body and adjacent to the top side and the bottom side of the guide member, respectively, to limit the guide member to lateral movement.

6. The electronic device according to claim 3, wherein the panel further comprises two longitudinal retaining walls perpendicular to the movement direction of the guide member, the two longitudinal retaining walls are formed at the surface of the panel body and adjacent to the left side and the right side of the first fastening member, respectively, to limit the first fastening member to longitudinal movement.

7. The electronic device according to claim 3, wherein the two second lateral retaining walls are adjacent to the top side of the top elastic arm and the bottom side of the bottom elastic arm, respectively.

8. The electronic device according to claim 3, wherein the guide member comprises a second lateral through hole, a locking member having an expansion end and a locking end passing through the second lateral through hole to be fixedly connected to the panel body, and the longitudinal size of the expansion end is larger than the longitudinal size of the second lateral through hole to limit the guide member to front-back movement.

9. The electronic device according to claim 3, wherein the first guide channel is an oblique long through hole, and the first guide channel extends from the first end at the top-left to the second end at the bottom-right.

10. The electronic device according to claim 3, wherein the panel body further has a second side edge, the guide member further has a second guide channel having a third end and a fourth end, the third end is nearer to the second side edge than the fourth end, the panel further comprises a second fastening member having a sheet structure and a second guide pillar protruding from the sheet structure, the second guide pillar is inserted into the second guide channel, and when the guide member is moved to allow the second guide pillar to move from the fourth end to the third end along the second guide channel, the second fastening member is driven to protrude from the second side edge to be fastened to the base.

11. An electronic device, comprising: a main body having a container; and
    an optical disk drive for containing a disc and disposed in the container, the optical disk drive comprising:
        a first button disposed at the front of the optical disk drive; and a second button disposed at the front of the optical disk drive and movably connected to the main body, when the second button moves to a first position, the first button is triggered to expose the disc; when the second button moves to a second position, the second button is fastened to the main body to avoid exposing the disc;
        a panel disposed at the front of the optical disk drive, the panel has a panel body having a first side edge, and a guide member connected to the panel body, wherein the guide member is capable of moving relatively to the panel body, the guide member has a first guide channel having a first end and a second end, and the first end is nearer to the first side edge than the second end, the guide member comprises a second lateral through hole, a locking member having an expansion end and a locking end passing through the second lateral through hole to be fixedly connected to the panel body, and the longitudinal size of the expansion end is larger than the longitudinal size of the second lateral through hole to limit the guide member to front-back movement.

12. The electronic device according to claim 11, wherein the panel further has a first fastening member having a sheet structure and a first guide pillar protruding from the sheet structure.

13. The electronic device according to claim 12, wherein the first guide pillar is inserted into the first guide channel, wherein when the guide member is moved to allow the first guide pillar to move from the second end to the first end along the first guide channel, the sheet structure is driven to protrude from the first side edge to be fastened to the base.

14. An electronic device, comprising: a main body having a container; and
    an optical disk drive having a tray and disposed in the container, the optical disk drive comprising: a casing; a first button disposed at the front of the casing; and a second button movably connected to the casing, when the second button moves to a first position, the first button is triggered to expose the tray; when the second button moves to a second position, the second button is fastened to the casing to avoid exposing the tray;
    a panel disposed at the front of the casing the panel has a panel body having a first side edge, and a guide member connected to the panel body, wherein the guide member is capable of moving relatively to the panel body, the guide member has a first guide channel having a first end and a second end, and the first end is nearer to the first side edge than the second end,
    wherein the panel further has a first fastening member having a first sheet structure and a first guide pillar protruding from the first sheet structure, the first guide pillar is inserted into the first guide channel, when the guide member is moved to allow the first guide pillar to move from the second end to the first end along the first guide channel, the first sheet structure is driven to protrude from the first side edge to be fastened to the base, wherein the guide member further has a second guide channel having a third end and a fourth end, the third end is nearer to the second side edge than the fourth end, the panel further comprises a second fastening member having a second sheet structure and a second guide pillar protruding from the second sheet structure, the second guide pillar is inserted into the second guide channel, and when the guide member is moved to allow the second guide pillar to move from the fourth end to the third end along the second guide channel, the second fastening member is driven to protrude from the second side edge to be fastened to the base.

* * * * *